US012169373B2

(12) United States Patent
Itabashi

(10) Patent No.: US 12,169,373 B2
(45) **Date of Patent: *Dec. 17, 2024**

(54) DEVELOPING CARTRIDGE

(71) Applicant: BROTHER KOGYO KABUSHIKI KAISHA, Nagoya (JP)

(72) Inventor: Nao Itabashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/447,392

(22) Filed: Aug. 10, 2023

(65) Prior Publication Data

US 2023/0384708 A1 Nov. 30, 2023

Related U.S. Application Data

(63) Continuation of application No. 17/869,917, filed on Jul. 21, 2022, now Pat. No. 11,754,941, which is a (Continued)

(30) Foreign Application Priority Data

Mar. 26, 2019 (JP) ................................ 2019-058547

(51) Int. Cl.
*G03G 15/06* (2006.01)

(52) U.S. Cl.
CPC ................................. *G03G 15/065* (2013.01)

(58) Field of Classification Search
CPC .................................................... G03G 15/065
See application file for complete search history.

(56) References Cited

U.S. PATENT DOCUMENTS 11,754,941 B2 * 9/2023 Itabashi ............... G03G 15/065 399/285
2007/0071480 A1 3/2007 Ishikawa
(Continued)

FOREIGN PATENT DOCUMENTS

CN 1940744 A 4/2007
CN 1991622 A 7/2007
(Continued)

OTHER PUBLICATIONS

Office Action with Search Report issued in corresponding Chinese Patent Application No. 202080023316.6, Jan. 11, 2024.
(Continued)

*Primary Examiner* — G. M. A Hyder
(74) *Attorney, Agent, or Firm* — Merchant & Gould P.C.

(57) ABSTRACT

A developing cartridge 1 may include a developing roller including a developing roller shaft, a casing capable of containing a developer material, and a developing electrode or a member configure to be electrically connected to the developing roller shaft. The developing electrode or the member has a first end portion configured to be electrically connected to the developing roller shaft and a second end portion located farther away from the developing roller shaft than the first end portion. The second end portion is farther away in the second direction from the one end of the casing than the first end portion is from the one end of the casing. The developing electrode has a first hole extending in the second direction between the first end portion and the second end portion.

8 Claims, 16 Drawing Sheets

Related U.S. Application Data continuation of application No. 17/235,014, filed on Apr. 20, 2021, now Pat. No. 11,402,763, which is a continuation of application No. 16/825,141, filed on Mar. 20, 2020, now Pat. No. 11,003,107.

(56) References Cited

U.S. PATENT DOCUMENTS

| | | | |
|---|---|---|---|
| 2007/0071481 | A1 | 3/2007 | Kamimura |
| 2007/0077093 | A1 | 4/2007 | Okabe et al. |
| 2007/0147888 | A1 | 6/2007 | Igarashi et al. |
| 2007/0166070 | A1 | 7/2007 | Sato |
| 2010/0067947 | A1 | 3/2010 | Yuzawa |
| 2010/0111562 | A1 | 5/2010 | Okabe et al. |
| 2011/0236066 | A1 | 9/2011 | Takagi |
| 2012/0308259 | A1 | 12/2012 | Abe |
| 2013/0051849 | A1 | 2/2013 | Itabashi et al. |
| 2013/0251402 | A1 | 9/2013 | Yamashita et al. |
| 2017/0261927 | A1 | 9/2017 | Sato et al. |
| 2017/0269546 | A1 | 9/2017 | Yokoi |
| 2017/0285570 | A1 | 10/2017 | Sakata et al. |
| 2017/0336754 | A1 | 11/2017 | Itabashi |
| 2018/0017928 | A1 | 1/2018 | Ichikawa et al. |
| 2018/0095416 | A1 | 4/2018 | Nishiyama et al. |
| 2018/0299823 | A1 | 10/2018 | Uyama et al. |

FOREIGN PATENT DOCUMENTS

| | | | |
|---|---|---|---|
| CN | 201229468 | Y | 4/2009 |
| CN | 101833262 | A | 9/2010 |
| CN | 102200726 | A | 9/2011 |
| CN | 202748592 | U | 2/2013 |
| CN | 103324072 | A | 9/2013 |
| CN | 104412173 | A | 3/2015 |
| CN | 107229202 | A | 10/2017 |
| CN | 206594453 | U | 10/2017 |
| CN | 107402510 | A | 11/2017 |
| CN | 107861349 | A | 3/2018 |
| CN | 108241269 | A | 7/2018 |
| JP | 5-46019 | A | 2/1993 |
| JP | 2003-186300 | A | 7/2003 |
| JP | 2009-58560 | A | 3/2009 |
| JP | 2013-54058 | A | 3/2013 |
| JP | 2015-11318 | A | 1/2015 |
| WO | 2014/141447 | A1 | 9/2014 |

OTHER PUBLICATIONS

International Search Report with a Written Opinion issued by the International Searching Authority in corresponding International Patent Application No. PCT/JP2020/012278, Jun. 23, 2020.

International Search Report with a Written Opinion issued by the International Searching Authority in corresponding International Patent Application No. PCT/JP2020/012279, Jun. 23, 2020.

International Search Report with a Written Opinion issued by the International Searching Authority in corresponding International Patent Application No. PCT/JP2020/012280, Jul. 7, 2020.

International Search Report with a Written Opinion issued by the International Searching Authority in corresponding International Patent Application No. PCT/JP2020/012281, Jun. 23, 2020.

Extended European Search Report issued in corresponding European Patent Application No. 20710757.4, Aug. 2, 2021.

Extended European Search Report issued in corresponding European Patent Application No. 20710756.6, Oct. 21, 2021.

Notification of First Office Action with Search Report issued in corresponding Chinese Patent Application No. 202080023200.2, Sep. 27, 2023.

Extended European Search Report issued in European Patent Application No. 20710758.2, Jul. 6, 2021.

Extended European Search Report issued in European Patent Application No. 20710755.8, Jul. 6, 2021.

Examination Report issued in Australian Patent Application No. 2020246265 on Mar. 22, 2022.

Examiner's Requisition issued in Canadian Patent Application No. 3,114,158, Apr. 27, 2022.

* cited by examiner

DEVELOPING CARTRIDGE

CROSS-REFERENCE TO RELATED APPLICATION

This application is a continuation of U.S. patent application Ser. No. 17/869,917 filed Jul. 21, 2022, which is a continuation of U.S. patent application Ser. No. 17/235,014 filed Apr. 20, 2021, now U.S. Pat. No. 11,402,763, which is a continuation of U.S. patent application Ser. No. 16/825,141, filed Mar. 20, 2020, now U.S. Pat. No. 11,003,107, which claims priority from Japanese Patent Application No. 2019-058547 filed on Mar. 26, 2019. The content of the aforementioned applications is incorporated herein by reference in its entirety.

TECHNICAL FIELD

The present disclosure relates to a developing cartridge.

BACKGROUND

Electro-photographic image forming apparatuses, such as laser printers and LED printers, have been developed. A developing cartridge is used in an image forming apparatus. The developing cartridge includes a developing roller for supplying a developer material.

The conventional developing cartridge is mounted on a drum cartridge. The drum cartridge includes a photosensitive drum. When the developing cartridge is mounted on the drum cartridge, the photosensitive drum is brought into contact with the developing roller. Thereafter, the drum cartridge having the developing cartridge mounted therein is mounted in the image forming apparatus.

SUMMARY

The developing cartridge includes a member for positioning the developing roller relative to the photosensitive drum. The developing cartridge further includes a developing electrode for supplying a bias voltage to a shaft of the developing roller. Still furthermore, the developing cartridge includes a member that receives a pressing force when separating the developing roller from the photosensitive drum. However, if the member for positioning the developing roller, the developing electrode for supplying a bias voltage to the shaft of the developing roller, and the member for receiving a pressing force at the time of separation are separately provided, the number of parts in the developing cartridge increases.

Accordingly, the object of the present disclosure is to provide a structure capable of reducing the number of parts in a developing cartridge.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

Embodiments of the present disclosure are described below with reference to the accompanying drawings.

Hereinafter, the direction in which a developing roller 30 of a developing cartridge 1 extends is referred to as a "first direction". In addition, the direction between which an agitator 20 and the developing roller 30 of the developing cartridge 1 are arranged is referred to as a "second direction". The first direction and the second direction cross (preferably, orthogonally cross) each other.

1. Overview of Developer Cartridge and Drum Cartridge

Figure 1:
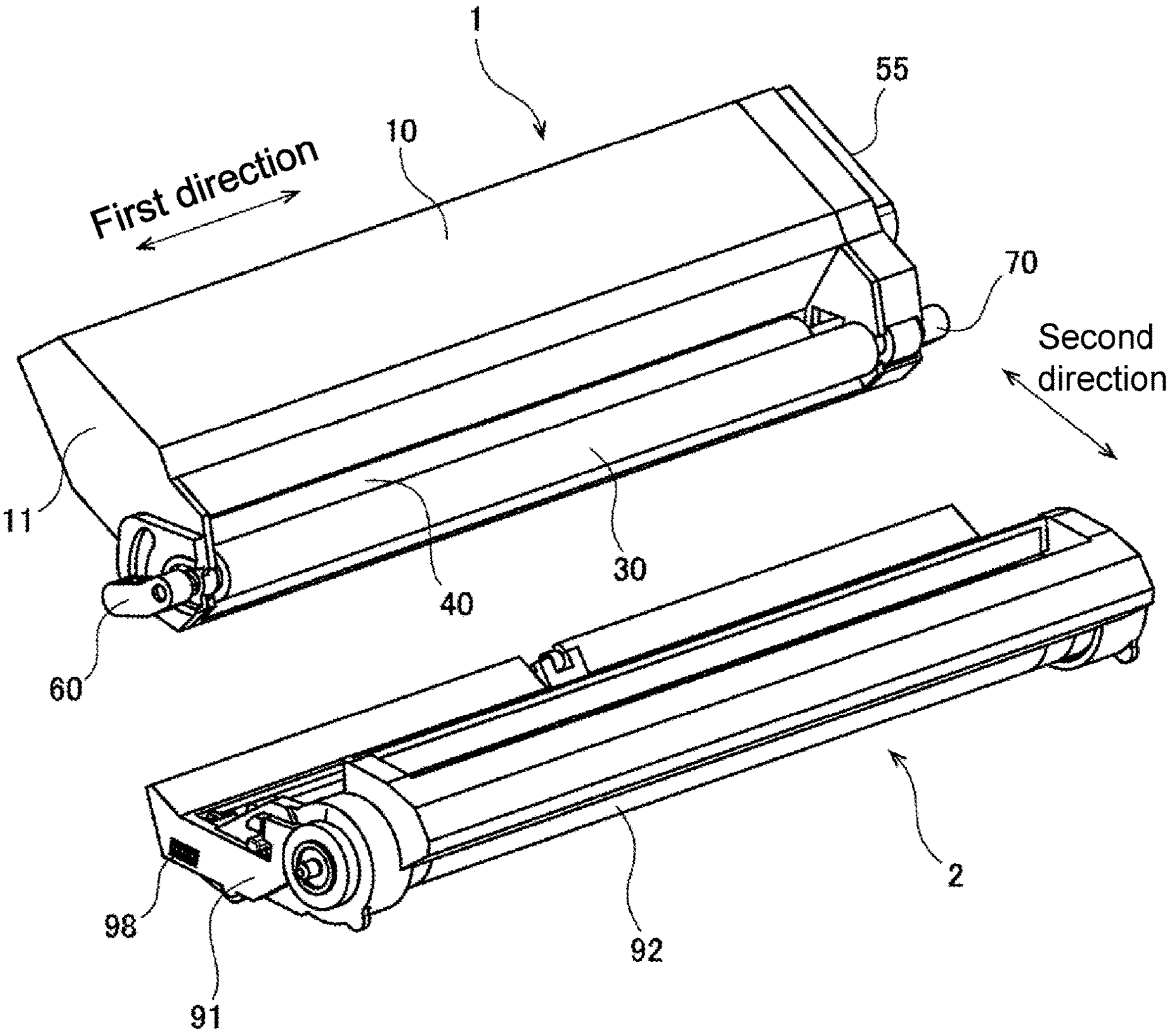
FIG. 1 is a perspective view of a developing cartridge and a drum cartridge.
Figure 2:
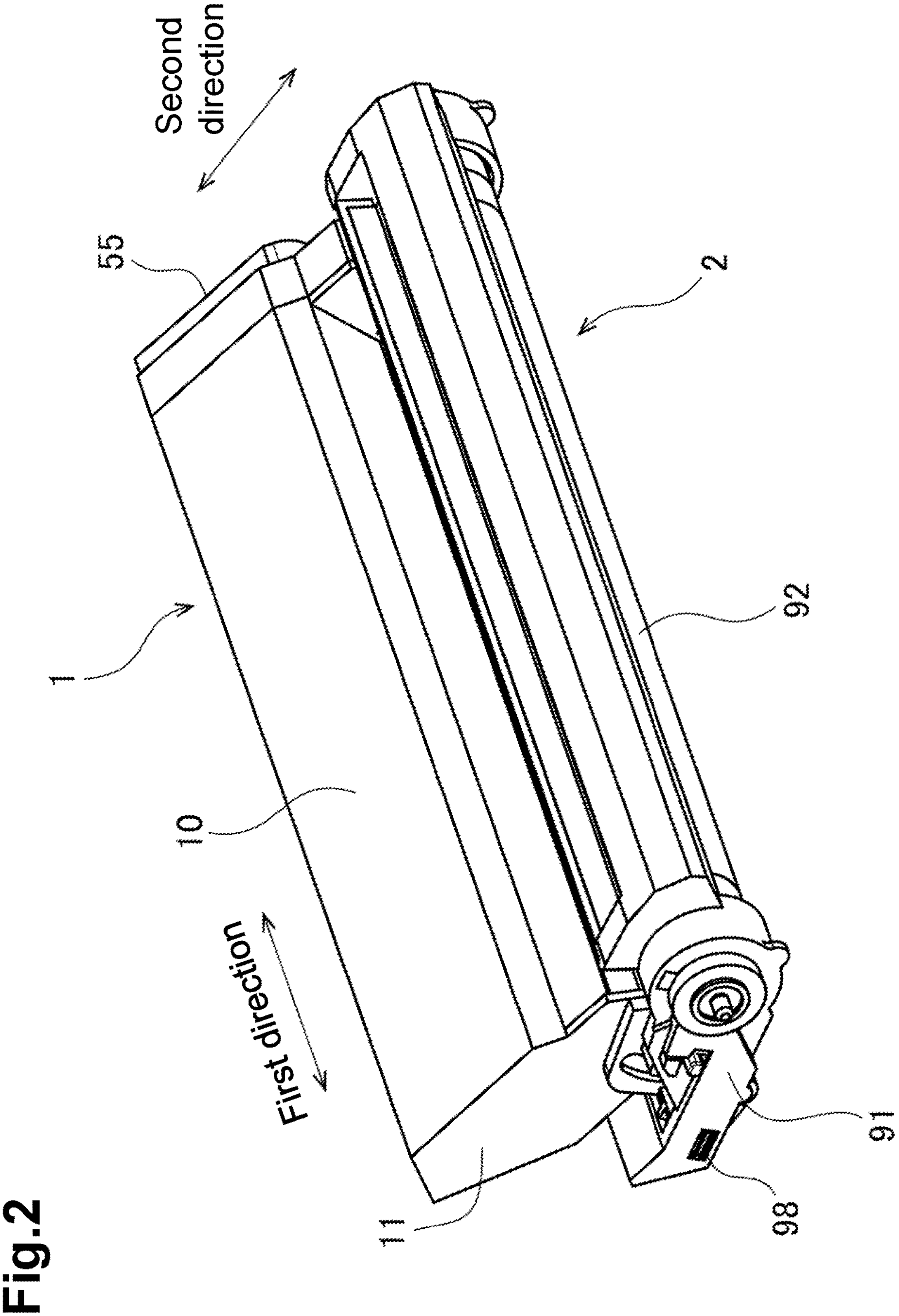
FIG. 2 is a perspective view illustrating the developing cartridge mounted on the drum cartridge.

FIG. 1 is a perspective view of the developing cartridge 1 and the drum cartridge 2. FIG. 2 is a perspective view of the developing cartridge 1 mounted on the drum cartridge 2. The developing cartridge 1 and the drum cartridge 2 are used in an electro-photographic image forming apparatus. An example of the image forming apparatus is a laser printer or an LED printer.

As illustrated in FIGS. 1 and 2, the developing cartridge 1 is used together with the drum cartridge 2. The developing cartridge 1 is mountable on the drum cartridge 2. The developing cartridge 1 is mounted on the drum cartridge 2 and, thereafter, is mounted in the image forming apparatus. The image forming apparatus allows, for example, four developing cartridges 1 to be mounted therein. The four developing cartridges 1 contain developer materials (for example, toner) of different colors (for example, cyan, magenta, yellow, and black). The image forming apparatus forms an image on a recording surface of print paper by using the developer materials supplied from the developing cartridges 1. Note that the number of developing cartridges 1 mountable in the image forming apparatus may be one or more and so, in addition to being four, may be one to three, or five or more.

2. Information About Developing Cartridge

Figure 3:
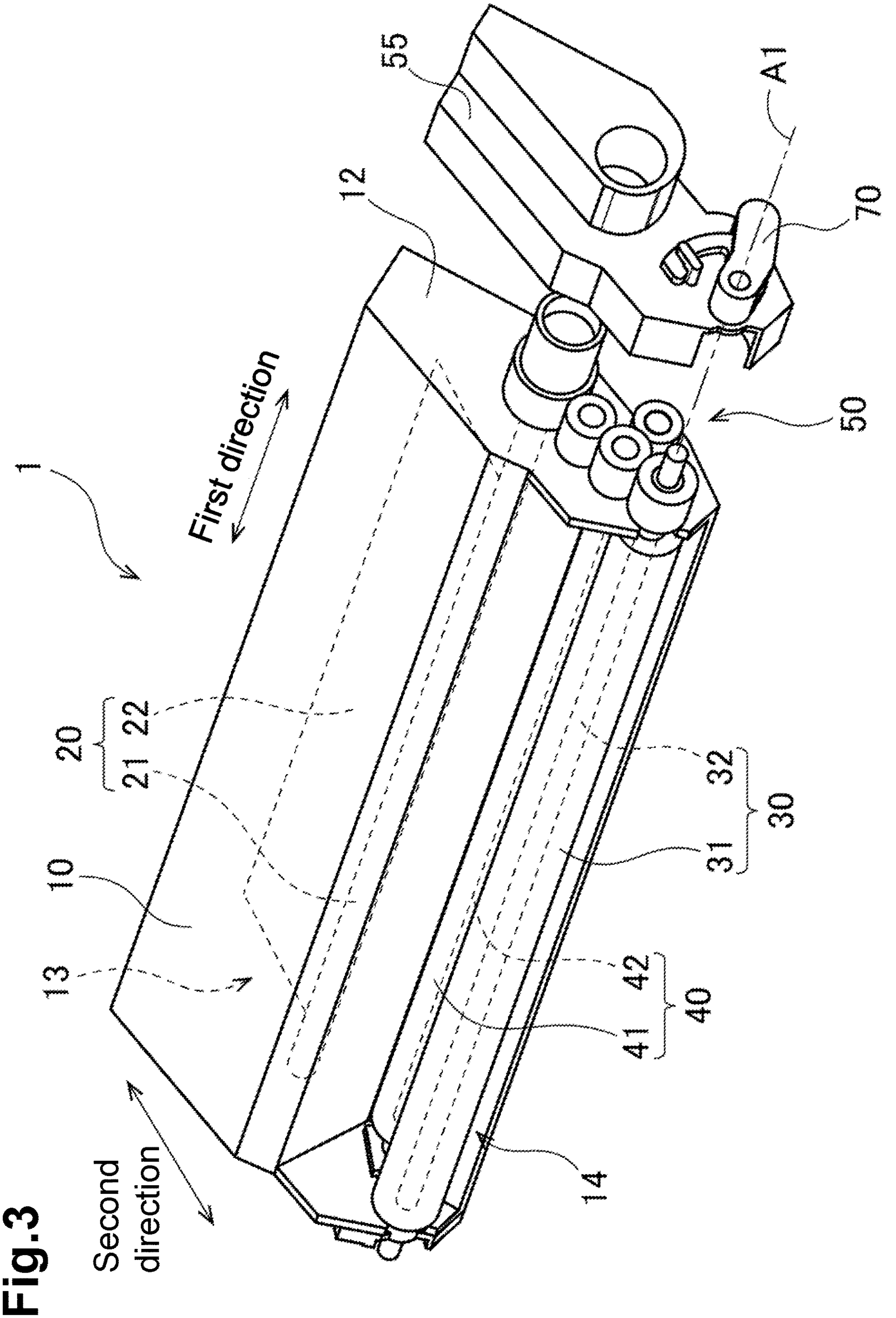
FIG. 3 is an exploded perspective view of the developing cartridge.
Figure 4:
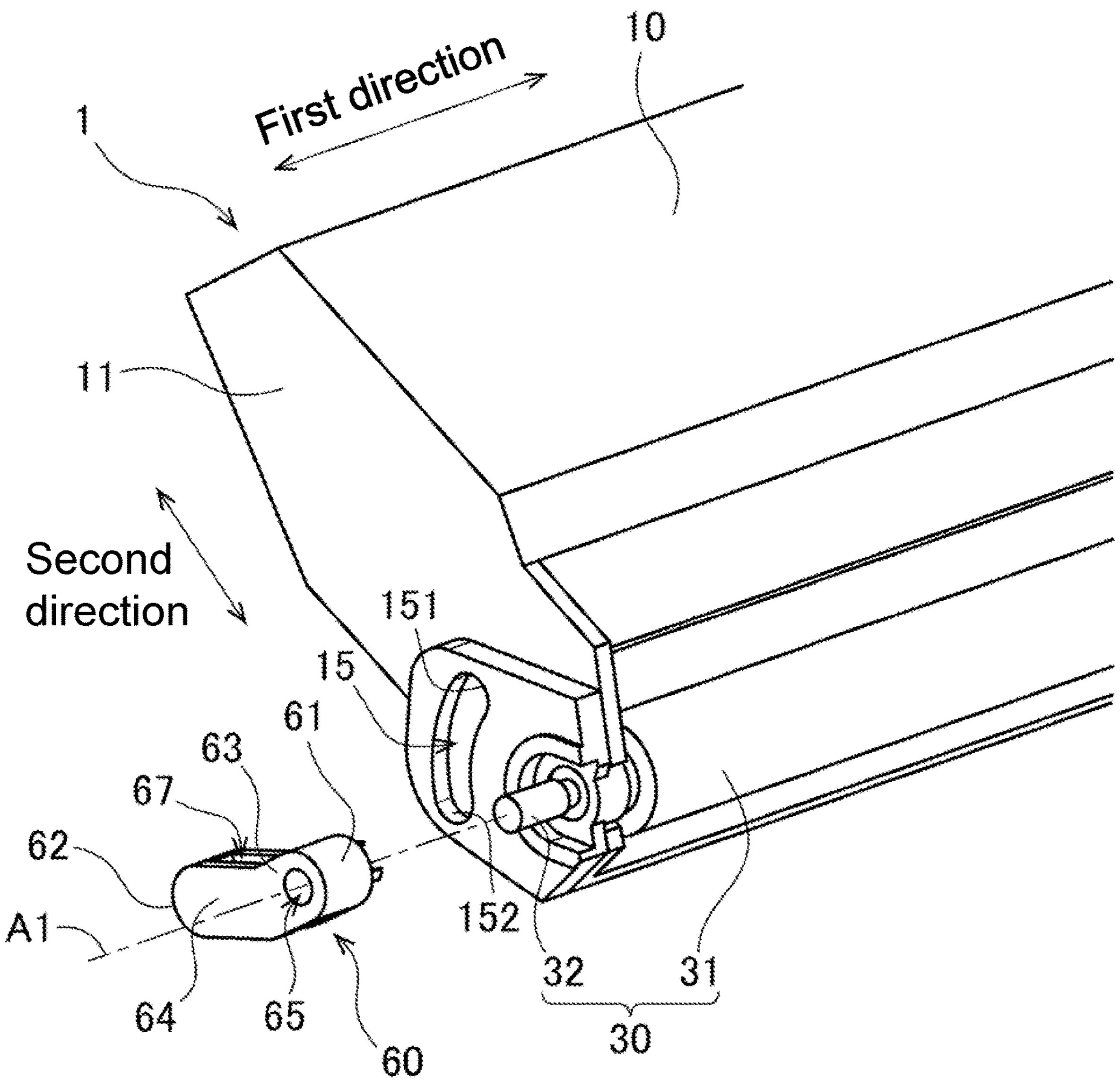
FIG. 4 is an exploded perspective view of a portion of the developing cartridge in the vicinity of a first outer surface of a casing.
Figure 5:
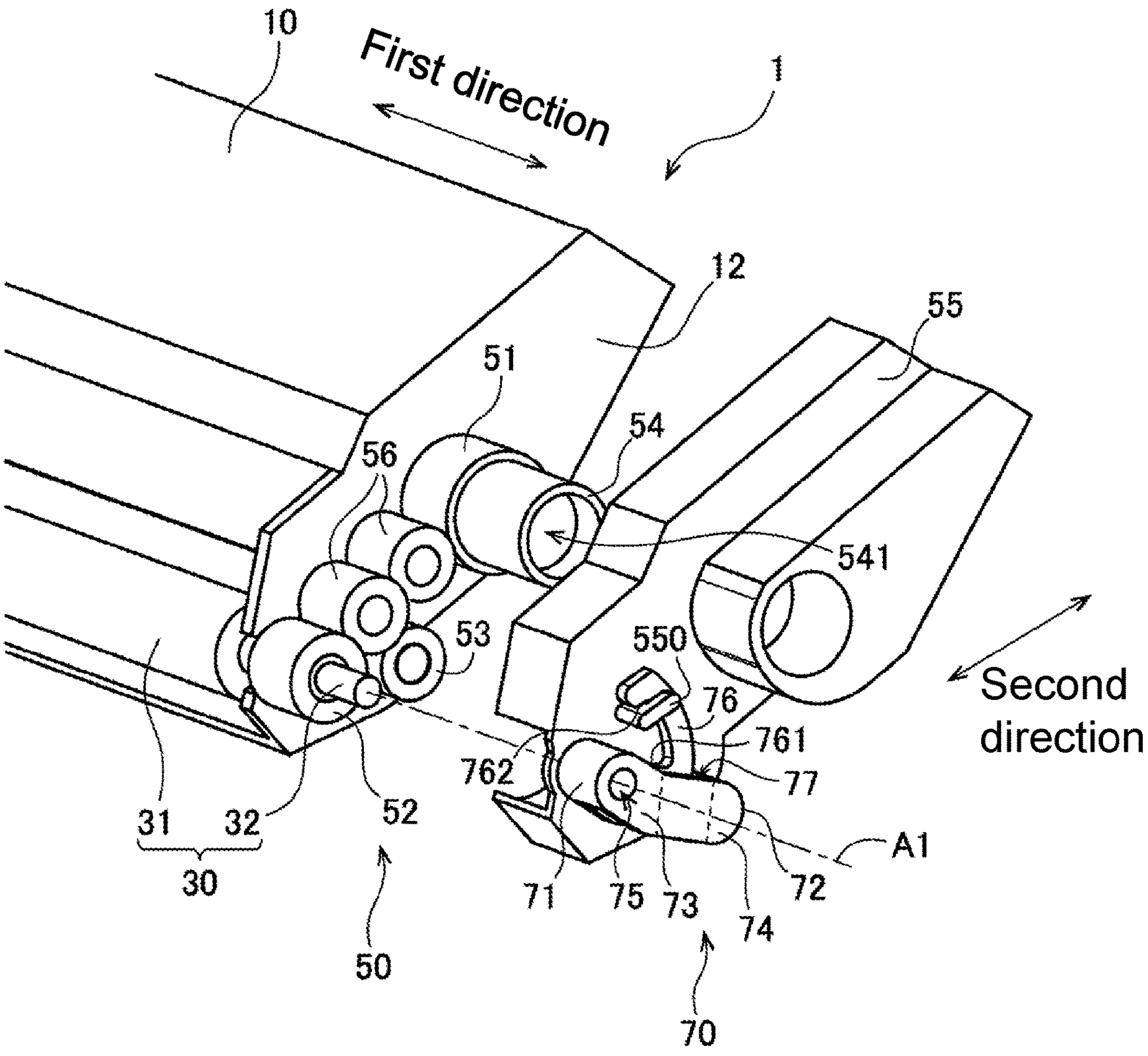
FIG. 5 is an exploded perspective view of a portion of the developing cartridge in the vicinity of a second outer surface of the casing.

FIG. 3 is an exploded perspective view of the developing cartridge 1. FIG. 4 is a view of the developing cartridge 1, in particular an exploded perspective view, in the vicinity of a first outer surface 11 of a casing 10. FIG. 5 is a view of the developing cartridge 1, in particular an exploded perspective view in the vicinity of a second outer surface 12 of the casing 10. As illustrated in FIGS. 1 to 5, the developing cartridge 1 includes the casing 10, the agitator 20, the developing roller 30, a supply roller 40, a gear unit 50, a first bearing 60, and a second bearing 70. The first bearing 60 is also a developing electrode 60.

The casing 10 is a casing capable of containing a developer material. The casing 10 has the first outer surface 11 and the second outer surface 12. The first outer surface 11 is located at one end of the casing 10 in the first direction. The second outer surface 12 is located at the other end of the casing 10 in the first direction. The first outer surface 11 and the second outer surface 12 are separated from each other in the first direction. The casing 10 extends in the first direction between the first outer surface 11 and the second outer surface 12. In addition, the casing 10 extends in the second direction.

The casing 10 has an accommodation chamber 13 provided thereinside. The developer material is stored in the accommodation chamber 13. In addition, the casing 10 has an opening 14. The opening 14 is located at one end 10*a* of the casing 10 in the second direction. The outside of the casing 10, in other words the external space, and the accommodation chamber 13 of the casing 10 communicate with each other through the opening 14. Note that the casing 10 may have a handle on the outer surface at the other end 10*b* in the second direction.

The agitator 20 includes an agitator shaft 21 and a blade 22. The agitator shaft 21 extends in the first direction. The blade 22 extends or expands from the agitator shaft 21 toward the inner surface of the casing 10. The blade 22 and part of the agitator shaft 21 are disposed in the accommodation chamber 13 of the casing 10. An agitator gear 51 included in the gear unit 50 is attached to one end of the agitator shaft 21 in the first direction. The agitator shaft 21 is fixed to the agitator gear 51 so as not to rotate relative to the agitator gear. When the agitator gear 51 rotates, the agitator shaft 21 and the blade 22 rotate about the rotation axis extending in the first direction. Thus, the developer material is agitated in the accommodation chamber 13 by the blade 22 that is rotating.

The developing roller 30 is a roller that can rotate about a rotation axis (a first axis) A1 extending in the first direction. The developing roller 30 is located in the opening 14 of the casing That is, the developing roller 30 is located at the one end of the casing 10 in the second direction. The developing roller 30 includes a developing roller main body 31 and a developing roller shaft 32. The developing roller main body 31 is a cylindrical member extending in the first direction. As the material used for the developing roller main body 31, rubber having resilience is used, for example. The developing roller shaft 32 is a cylindrical member that extends in the first direction and passes completely through the developing roller main body 31. The developing roller shaft 32 is electrically conductive. For the material of the developing roller shaft 32, metal or resin having electrical conductivity is used.

The developing roller main body 31 is fixed to the developing roller shaft 32 so as not to rotate relative to the developing roller shaft 32. Furthermore, a developing roller gear 52 included in the gear unit 50 is attached to an end portion of the developing roller shaft 32 in the first direction. The developing roller shaft 32 is fixed to the developing roller gear 52 so as not to rotate relative to the developing roller gear 52. Accordingly, when the developing roller gear 52 rotates, the developing roller shaft 32 rotates, and the developing roller main body 31 also rotates together with the developing roller shaft 32.

Note that the developing roller shaft 32 need not pass completely through the developing roller main body 31 in the first direction. For example, the developing roller shaft 32 may comprise two respective parts that extend in the first direction from both ends of the developing roller main body 31 in the first direction.

The supply roller 40 is a roller that is rotatable about a rotation axis (a second axis) extending in the first direction. The supply roller 40 is located between the agitator 20 and the developing roller 30. The supply roller 40 includes a supply roller main body 41 and a supply roller shaft 42. The supply roller main body 41 is a cylindrical member extending in the first direction. As the material used for the supply roller main body 41, rubber having resilience is used, for example. The supply roller shaft 42 is a columnar member extending in the first direction so as to pass completely through the supply roller main body 41.

The supply roller main body 41 is fixed to the supply roller shaft 42 so as not to rotate relative to the supply roller shaft 42. In addition, a supply roller gear 53 included in the gear unit 50 is attached to an end of the supply roller shaft 42 in the first direction. The supply roller shaft 42 is fixed to the supply roller gear 53 so as not to rotate relative to the supply roller gear. Consequently, if the supply roller gear 53 rotates, the supply roller shaft 42 also rotates and, thus, the supply roller main body 41 also rotates together with the supply roller shaft 42.

Note that the supply roller shaft 42 need not pass completely through the supply roller main body 41 in the first direction. For example, the supply roller shaft 42 may comprise two respective parts that extend in the first direction from both ends of the supply roller main body 41 in the first direction.

When the developing cartridge 1 receives the driving force, the developer material is supplied from the accommodation chamber 13 in the casing 10 to the outer peripheral surface of the developing roller 30 via the supply roller 40. At this time, the developer material is triboelectrically charged between the supply roller 40 and the developing roller 30. In addition, a bias voltage is applied to the developing roller shaft 32 of the developing roller 30. For this reason, the developer material is attracted to the outer peripheral surface of the developing roller main body 31 by the electrostatic force between the developing roller shaft 32 and the developer material.

Furthermore, the developing cartridge 1 includes a layer thickness regulation blade (not illustrated). The layer thickness regulation blade shapes the developer material supplied onto the outer peripheral surface of the developing roller main body 31 into a predetermined thickness. Thereafter, the developer material on the outer peripheral surface of the developing roller main body 31 is supplied to a photosensitive drum 92 (described below) of the drum cartridge 2. At this time, the developer material moves from the developing roller main body 31 onto the photosensitive drum 92 in accordance with an electrostatic latent image formed on the outer peripheral surface of the photosensitive drum 92. In this manner, the electrostatic latent image is visualized on the outer peripheral surface of the photosensitive drum 92.

The gear unit 50 is located on the second outer surface 12 of the casing 10. As illustrated in FIG. 5, the gear unit 50 includes the above-described agitator gear 51, developing roller gear 52, and supply roller gear 53, a plurality of idle gears 56, a coupling 54, and a gear cover 55. The gear cover 55 and the cover 10 together constitute the overall casing of the developing cartridge 1 together with the casing 10. The gear cover 55 is fixed to the second outer surface 12 of the casing 10 by, for example, screwing. At least some of the plurality of gears are located between the second outer surface 12 and the gear cover 55.

The coupling 54 has an engagement portion 541 recessed in the first direction. The engagement portion 541 is exposed through the gear cover 55. When the developing cartridge 1 mounted on the drum cartridge 2 is mounted in an image forming apparatus having a drive shaft, the drive shaft of the image forming apparatus is connected to the engagement portion 541 of the coupling 54. Thus, the rotation of the drive shaft of the image forming apparatus is transmitted to the agitator gear 51, the plurality of idle gears 56, the developing roller gear 52, and the supply roller gear 53 via the coupling 54.

The plurality of gears included in the gear unit 50 may transmit the rotational force by meshing of teeth or may transmit the rotational force by friction.

Figure 6:
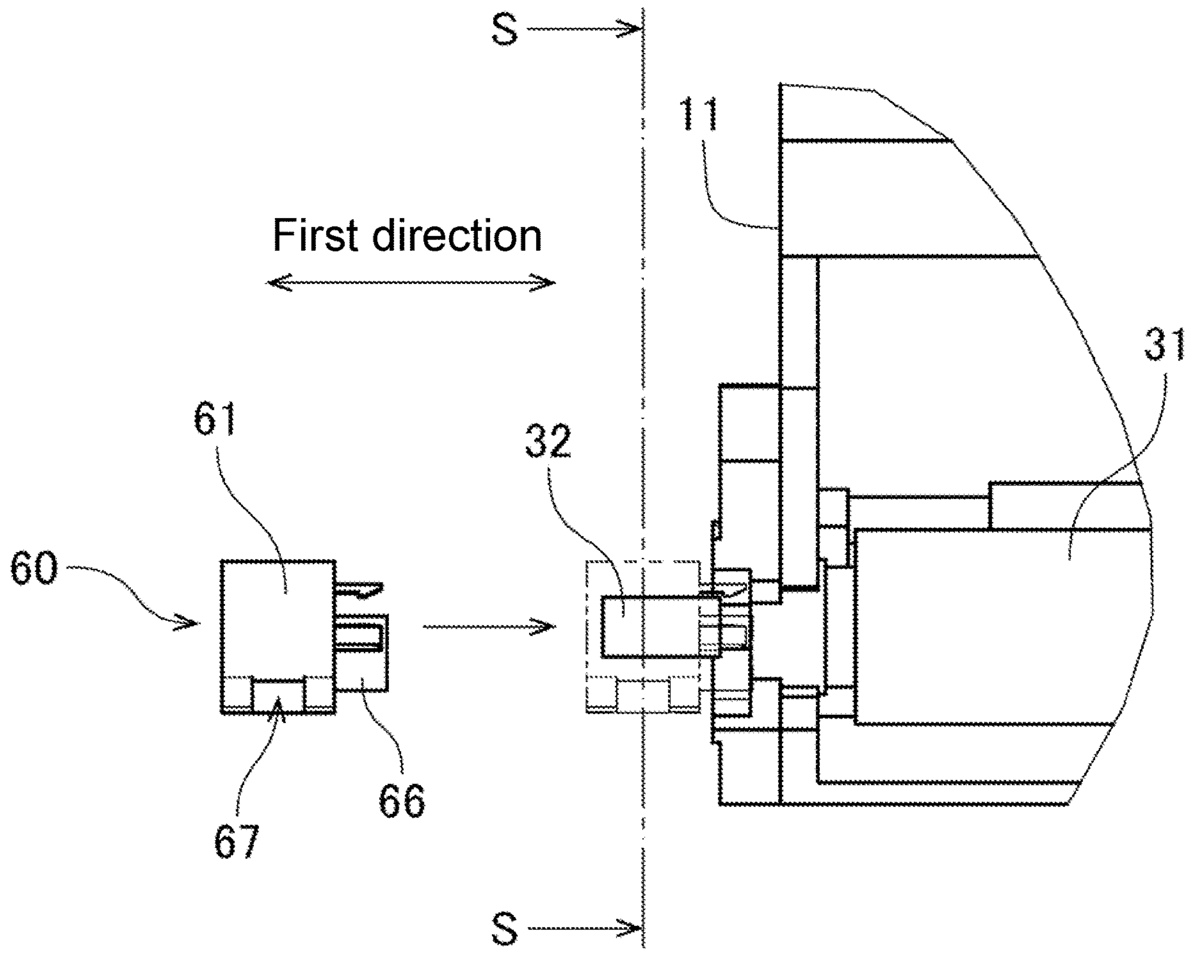
FIG. 6 is an exploded front view of the developing cartridge in the vicinity of the first outer surface of the casing.

FIG. 6 is a view of the developing cartridge 1 in particular an exploded front view in the vicinity of the first outer surface 11 of the casing 10. As illustrated in FIGS. 1, 4 and 6, the first bearing 60 is located on the first outer surface 11 of the casing 10. The first bearing 60 rotatably supports one end of the developing roller shaft 32 in the first direction.

The first bearing 60 has a first end portion 61 and a second end portion 62. The second end portion 62 is farther away from the developing roller shaft 32 than the first end portion 61 is to the developing roller shaft 32. In addition, the second end portion 62 is farther away in the second direction from the one end 10*a* of the casing 10 in the second direction than the first end portion 61 is to the one end 10*a* of the casing 10 in the second direction. The first bearing 60 extends along the first outer surface 11 of the casing 10 between the first end portion 61 and the second end portion 62.

The first bearing 60 includes a first arm 63 and a second arm 64. The second arm 64 is farther away from the developing roller shaft 32 than the first arm 63. In addition, the second arm 64 is farther away from the one end 10*a* in the second direction of the casing 10 than the first arm 63 is to the one end 10*a* in the second direction. The first arm 63 has the first end portion 61 described above. The second arm 64 has the second end portion 62 described above. The first arm 63 extends along the first outer surface 11 of the casing 10, for example, linearly. The second arm 64 extends along the first outer surface 11 of the casing 10, for example, linearly. Note that the first arm 63 is at an angle to the second arm 64. The angle formed by the first arm 63 and the second arm 64 is an obtuse angle.

According to the present embodiment, the first arm 63 and the second arm 64 are integrally formed. However, the first arm 63 and the second arm 64 may be separate parts. In this case, the first arm 63 and the second arm 64 can be fixed to each other.

The first bearing 60 has a first shaft hole 65. The first shaft hole 65 extends in the first direction in the first end portion 61 of the first bearing 60. The first shaft hole 65 may be a through-hole passing through the first end portion 61 in the first direction. Alternatively, the first shaft hole 65 may be a hole that does not pass through the first end portion 61. The first shaft hole 65 has a cylindrical inner peripheral surface. One end of the developing roller shaft 32 in the first direction is inserted into the first shaft hole 65. Thus, the one end of the developing roller shaft 32 in the first direction is supported so as to be rotatable about a rotation axis (a first axis) A1 extending in the first direction. In addition, the first bearing 60 is pivotable about the rotation axis A1 with respect to the casing 10. More specifically, the second end portion 62 is pivotable about the rotation axis A1 with respect to the first end portion 61.

The first bearing 60 serves as an electrically conductive member which, because it provides electrical connection to the developing roller shaft 32, is described herein as a developing electrode. The first bearing 60 is made of, for example, a conductive resin. However, the first bearing 60 may be made of metal. The first end portion 61 of the first bearing 60 is in contact with the one end of the developing roller shaft 32 in the first direction. Consequently, the first end portion 61 of the first bearing 60 is electrically connected to the developing roller shaft 32. Alternatively, the first bearing 60 may be a pivotable member. The pivotable member may be configured to electrically connected to the developing roller shaft (32). Preferably, the first pivotable member may be a pivotable lever.

As illustrated in FIG. 4, the casing 10 has a casing recess 15. The inner surface of the casing recess 15 includes a first restricting surface 151 and a second restricting surface 152. The first restricting surface 151 and the second restricting surface 152 are separated from each other in the rotational direction of the second end portion 62 about the rotation axis A1. In addition, as illustrated in FIG. 6, the first bearing 60 has a protrusion, for example having a rod-like shape, described herein as a bearing shaft 66. The bearing shaft 66 protrudes from the second end portion 62 of the first bearing 60 toward the other side in the first direction. The bearing shaft 66 is inserted into the casing recess 15.

Figure 7:
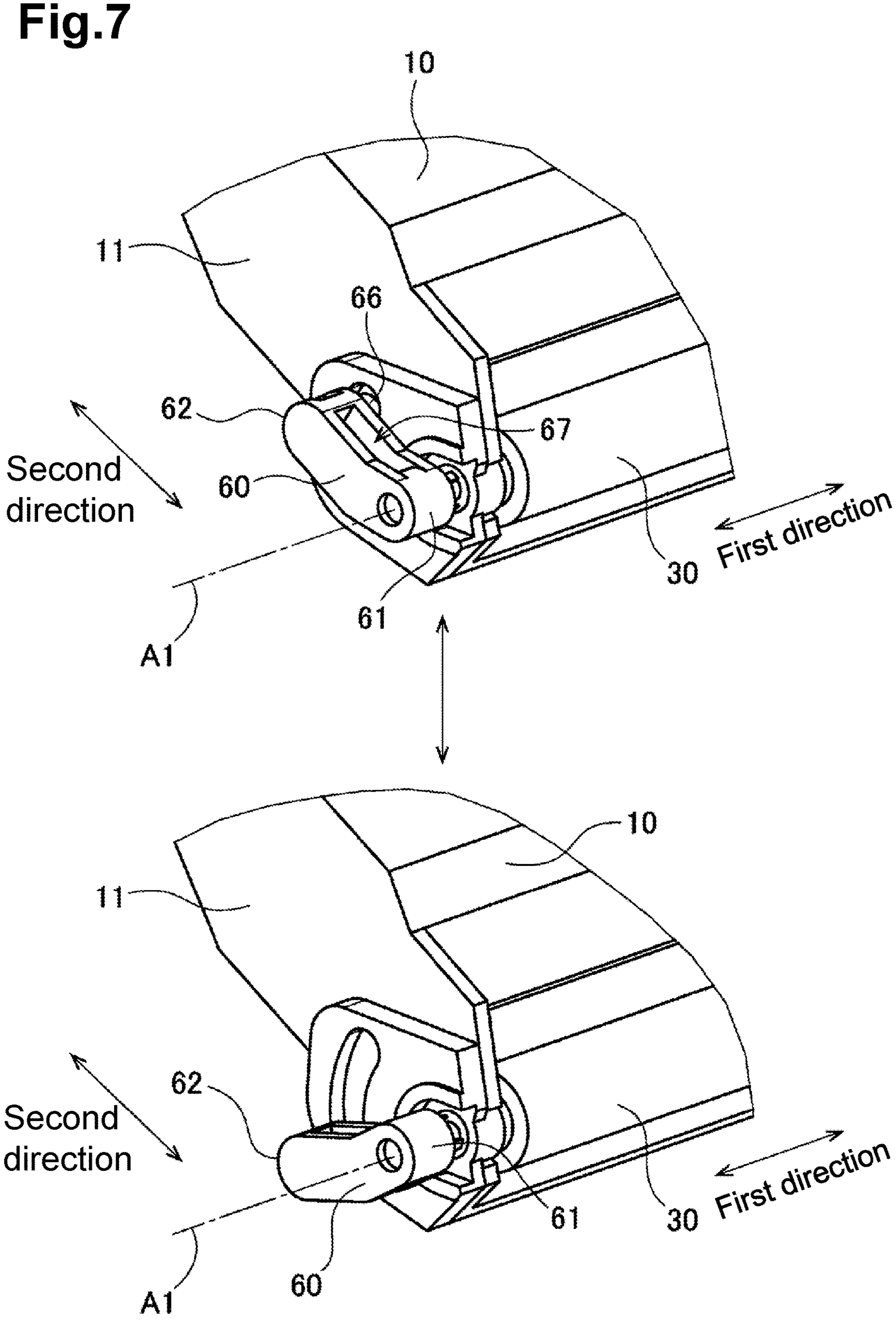
FIG. 7 is a view illustrating the pivotal movement of a first bearing.
Figure 8:
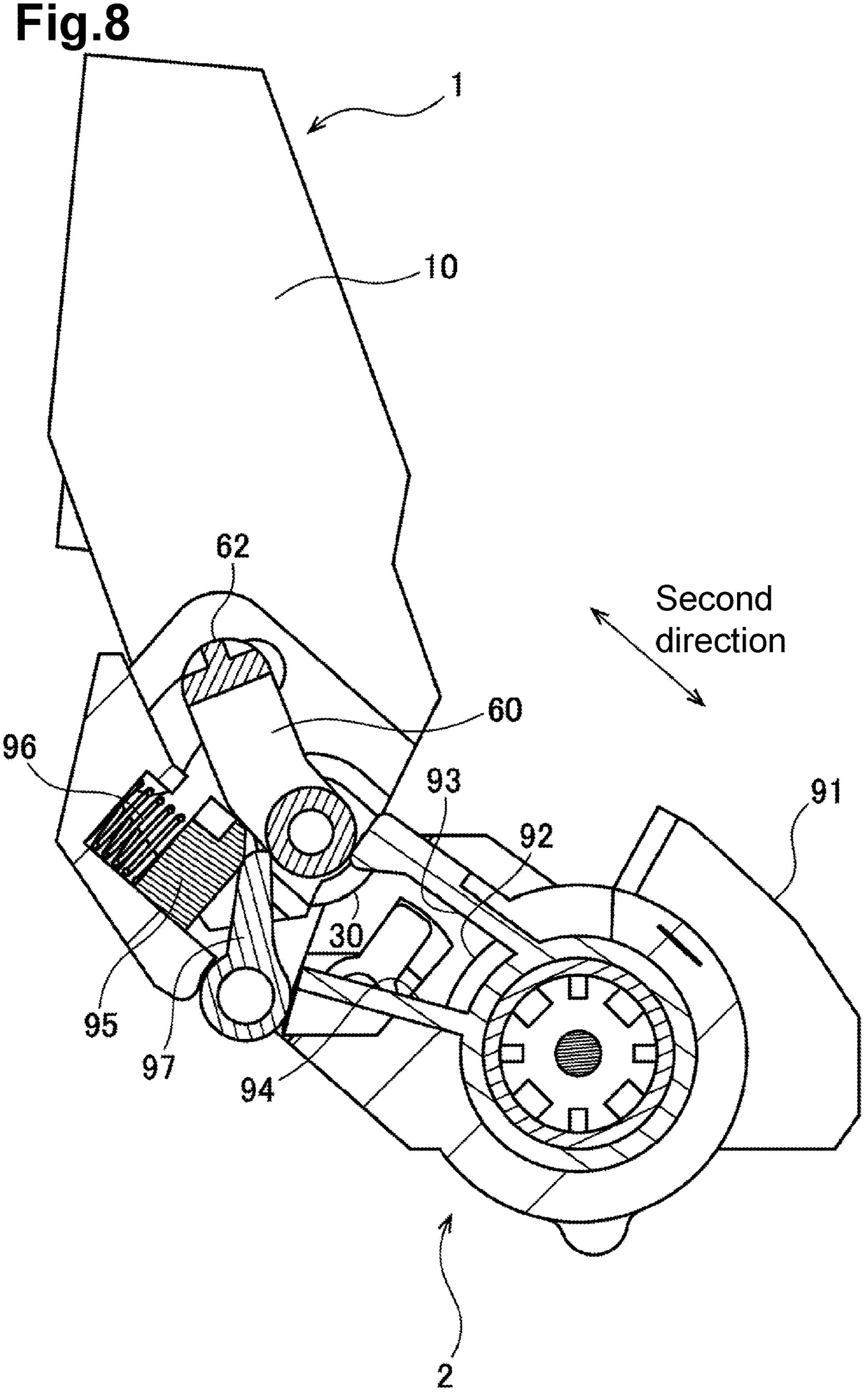
FIG. 8 is a cross-sectional view of the developing cartridge and the drum cartridge when the developing cartridge is mounted on the drum cartridge.

FIG. 7 illustrates how the first bearing 60 pivots. The first bearing 60 is pivotable about the rotation axis A1 between a first position illustrated in the upper section of FIG. 7 and a second position illustrated in the lower section of FIG. 7. When the first bearing 60 is located at the first position, the bearing shaft 66 is in contact with the first restricting surface 151. In contrast, when the first bearing 60 is located at the second position, the bearing shaft 66 is in contact with the second restricting surface 152. In this manner, the pivot range of the first bearing 60 about the rotation axis A1 is restricted.

In addition, the first bearing 60 has a first hole 67. The first hole 67 extends in the second direction between the first end portion 61 and the second end portion 62. Furthermore, the first hole 67 passes completely through the first bearing 60 in a pivotal direction about the rotation axis A1. However, the first hole 67 need not pass completely through the first bearing 60. When the developing cartridge 1 is mounted on the drum cartridge 2, the first hole 67 allows a first lever 97 (described below) of the drum cartridge 2 to be inserted thereinto.

As illustrated in FIG. 3, the second bearing 70 is located on the second outer surface 12 of the casing 10. More specifically, the second bearing 70 is located on the outer surface of the gear cover 55. The first bearing 60 and the second bearing 70 are located so as to overlap each other, as viewed in the first direction. The second bearing 70 rotatably supports the other end of the developing roller shaft 32 in the first direction. The second bearing 70 has a third end portion 71 and a fourth end portion 72. The fourth end portion 72 is farther away from the developing roller shaft 32 than the third end portion 71. In addition, the fourth end portion 72 is farther away in the second direction from the one end 10*a* of the casing 10 in the second direction than the third end portion 71 is to the one end 10*a* of the casing 10 in the second direction. The second bearing 70 extends along the second outer surface 12 of the casing 10 between the third end portion 71 and the fourth end portion 72.

The second bearing 70 includes a third arm 73 and a fourth arm 74. The fourth arm 74 is farther away from the developing roller shaft 32 than the third arm 73. In addition, the fourth arm 74 is farther away in the second direction from the one end 10*a* of the casing 10 in the second direction than the third arm 73 is to the one end 10*a* of the casing 10 in the second direction. The third arm 73 has the third end portion 71 described above. The fourth arm 74 has the fourth end portion 72 described above. The third arm 73 extends along the second outer surface 12 of the casing 10, for example, linearly. The fourth arm 74 extends along the second outer surface 12 of the casing 10, for example, linearly. However, the third arm 73 is at an angle to the fourth arm 74. The angle formed by the third arm 73 and the fourth arm 74 is an obtuse angle.

According to the present embodiment, the third arm 73 and the fourth arm 74 are integrally formed. However, the third arm 73 and the fourth arm 74 may be separate parts. In this case, it is only required that the third arm 73 and the fourth arm 74 are fixed to each other.

The second bearing 70 has a second shaft hole 75. The second shaft hole 75 extends in the first direction in the third end portion 71 of the second bearing 70. The second shaft hole 75 may be a through-hole passing through the third end portion 71 in the first direction. Alternatively, the second shaft hole 75 may be a hole that does not pass through the third end portion 71. The second shaft hole 75 has a cylindrical inner circumferential surface. The other end of the developing roller shaft 32 in the first direction is inserted into the second shaft hole 75. In this manner, the other end of the developing roller shaft 32 in the first direction is supported in a rotatable manner about a rotation axis (a first axis) A1 extending in the first direction. In addition, the second bearing 70 is also pivotable about the rotation axis A1 with respect to the casing 10. More specifically, the fourth end portion 72 is pivotable about the rotation axis A1 with respect to the third end portion 71.

As illustrated in FIG. 5, the gear cover 55 has a gear cover projection 550. The gear cover projection 550 protrudes from the gear cover 55 toward the other side in the first direction. In addition, the second bearing 70 has a hook portion 76. The hook portion 76 protrudes from the outer surface of the second bearing 70 in the rotational direction of the fourth end portion 72 about the rotation axis A1. Furthermore, the second bearing 70 has a third restricting surface 761 located at the base end of the hook portion 76 and a fourth restricting surface 762 located at the top end of the hook portion 76. The third restricting surface 761 and the fourth restricting surface 762 are separated from each other in the pivotal direction of the fourth end portion 72 about the rotation axis A1.

The second bearing 70 is pivotable about the rotation axis A1 between the third position and the fourth position. When the second bearing 70 is located at the third position, the third restricting surface 761 of the second bearing 70 is in contact with the gear cover projection 550. In contrast, when the second bearing 70 is located at the fourth position, the fourth restricting surface 762 of the second bearing 70 is in contact with the gear cover projection 550. In this manner, the rotation range of the second bearing 70 is restricted.

In addition, the second bearing 70 has a third hole 77. The third hole 77 extends in the second direction between the third end portion 71 and the fourth end portion 72. Furthermore, the third hole 77 passes completely through the second bearing 70 in a pivotal direction about the rotation axis A1. However, the third hole 77 need not pass completely through the second bearing 70. When the developing cartridge 1 is mounted on the drum cartridge 2, the third hole 77 allows a second lever (described below) of the drum cartridge 2 to be inserted thereinto. The first hole 67 of the first bearing 60 and the third hole 77 of the second bearing 70 are located so as to overlap each other, as viewed in the first direction.

3. Structure of Drum Cartridge

As illustrated in FIGS. 1 and 2, the drum cartridge 2 includes the drum frame 91 and the photosensitive drum 92. The developing cartridge 1 is mounted on the drum frame 91. The photosensitive drum 92 is a cylindrical drum which is rotatable about a rotation axis extending in the first direction. The outer peripheral surface of the photosensitive drum 92 is coated with a photosensitive material. The photosensitive drum 92 is located at one end of the drum frame 91 in the second direction. When the developing cartridge 1 is mounted on the drum frame 91, the outer peripheral surface of the developing roller 30 is in contact with the outer peripheral surface of the photosensitive drum 92.

FIGS. 8 to 11 are cross-sectional views of the developing cartridge 1 and the drum cartridge 2 when the developing cartridge 1 is mounted on the drum cartridge 2. FIGS. 8 to 11 are cross-sectional views of the developing cartridge 1 and the drum cartridge 2 taken along a break line S-S of FIG. 6. As illustrated in FIGS. 8 to 11, the drum cartridge 2 has a first guide surface 93 and a second guide surface 94. The first guide surface 93 and the second guide surface 94 are located at one end of the drum frame 91 in the first direction. In addition, the first guide surface 93 and the second guide surface 94 are separated in the rotational direction about the rotation axis of the photosensitive drum 92. Note that the drum cartridge 2 further has a third guide surface (not illustrated) and a fourth guide surface (not illustrated) that are similar to the first guide surface 93 and the second guide surface 94, respectively, at the other end of the drum frame 91 in the first direction.

Furthermore, as illustrated in FIGS. 8 to 11, the drum cartridge 2 includes a first movable member 95 and a first coil spring 96. The first movable member 95 and the first coil spring 96 are electrically conductive. The first movable member 95 is made of, for example, a conductive resin. The first coil spring 96 is made of, for example, metal. The first movable member 95 and the first coil spring 96 are located at one end of the drum frame 91 in the first direction. The first coil spring 96 is a resilient member that can expand and contract in the second direction. One end of the first coil spring 96 in the second direction is connected to the first movable member 95. The other end of the first coil spring 96 in the second direction is connected to the drum frame 91. With the developing cartridge 1 mounted on the drum cartridge 2, the first movable member 95 applies pressure to the second end portion 62 of the first bearing 60 toward the photosensitive drum 92 by the resilience force of the first coil spring 96.

In addition, the drum cartridge 2 includes a second movable member (not illustrated) and a second coil spring (not illustrated). The second movable member and the second coil spring are located at the other end of the drum frame 91 in the first direction. With the developing cartridge 1 mounted on the drum cartridge 2, the second movable member applies a pressure to the fourth end portion 72 of the second bearing 70 toward the photosensitive drum 92 by the resilience force of the second coil spring.

Note that instead of using the first coil spring 96 and the second coil spring, other types of resilient members may be used for the drum cartridge 2. For example, the drum cartridge 2 may be provided with a spring other than a coil spring (e.g., a torsion spring or a leaf spring), rubber, or the like) as the resilient member.

In addition, as illustrated in FIGS. 8 to 11, the drum cartridge 2 includes a first lever 97. The first lever 97 is located at one end of the drum frame 91 in the first direction. The first lever 97 is located between the first movable member 95 and the photosensitive drum 92. The first lever 97 is pivotable about a rotation shaft extending in the first direction. When the developing cartridge 1 is mounted on the drum cartridge 2, the first lever 97 is inserted into, and so located in, the first hole 67 of the first bearing 60.

In addition, the drum cartridge 2 includes a second lever (not illustrated). The second lever is located at the other end of the drum frame 91 in the first direction. The second lever is located between the second movable member and the photosensitive drum 92. The second lever is pivotable about a rotation shaft extending in the first direction. When the developing cartridge 1 is mounted on the drum cartridge 2, the second lever is inserted into, and so located in, the third hole 77 of the second bearing 70.

4. Information About Operation to Mount Development Cartridge

Figure 9:
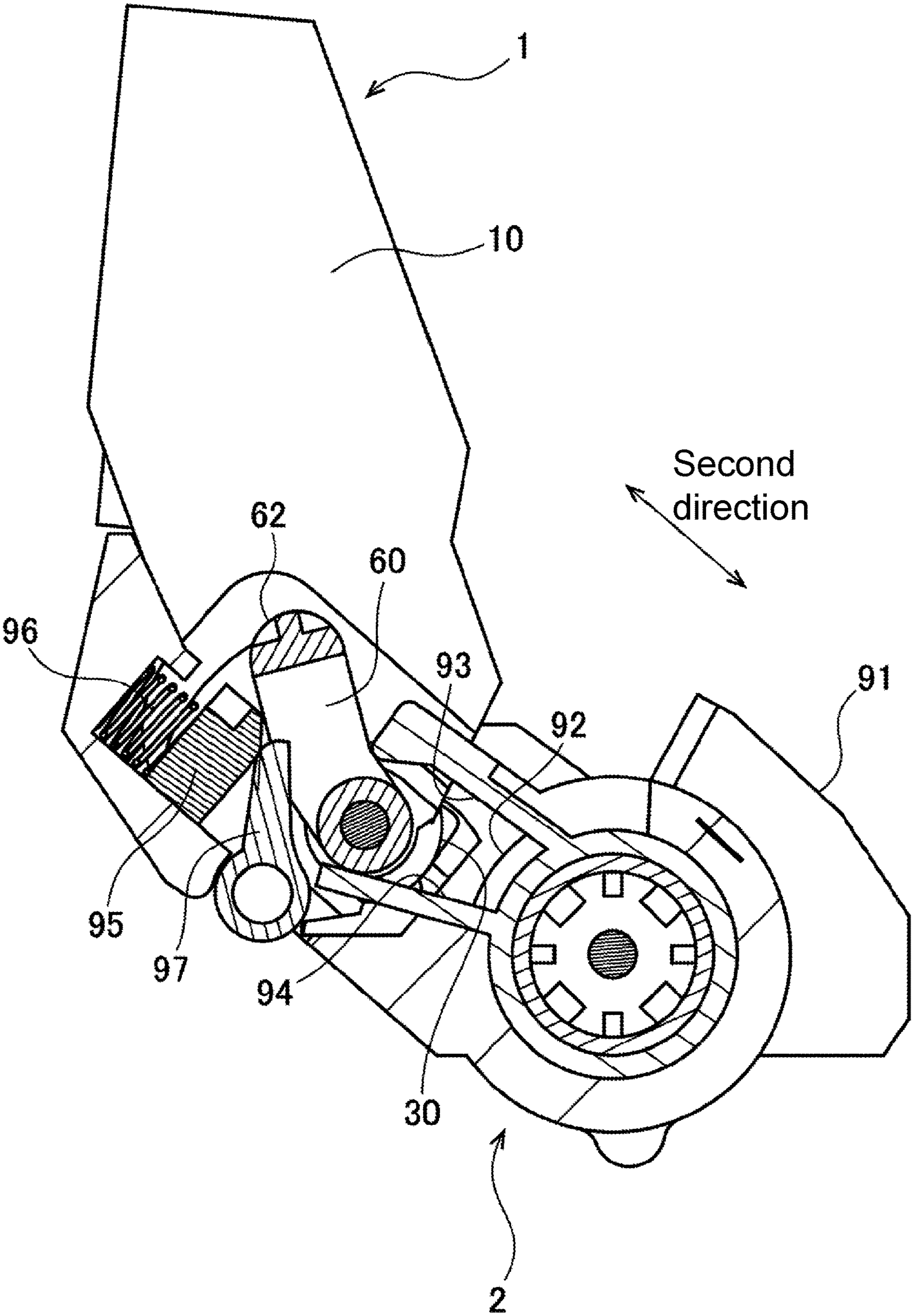
FIG. 9 is a cross-sectional view of the developing cartridge and the drum cartridge when the developing cartridge is mounted on the drum cartridge.
Figure 10:
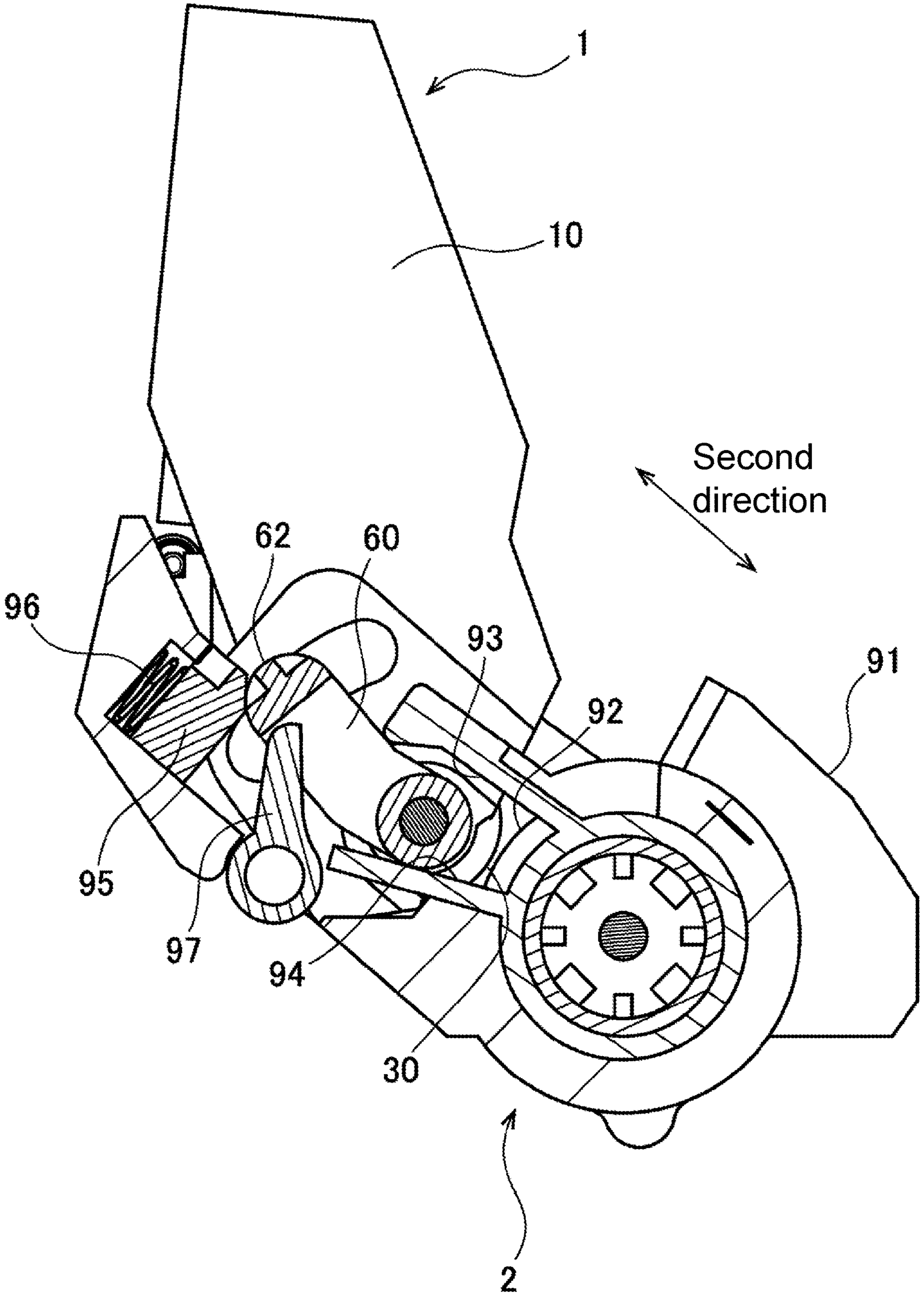
FIG. 10 is a cross-sectional view of the developing cartridge and the drum cartridge when the developing cartridge is mounted on the drum cartridge.
Figure 11:
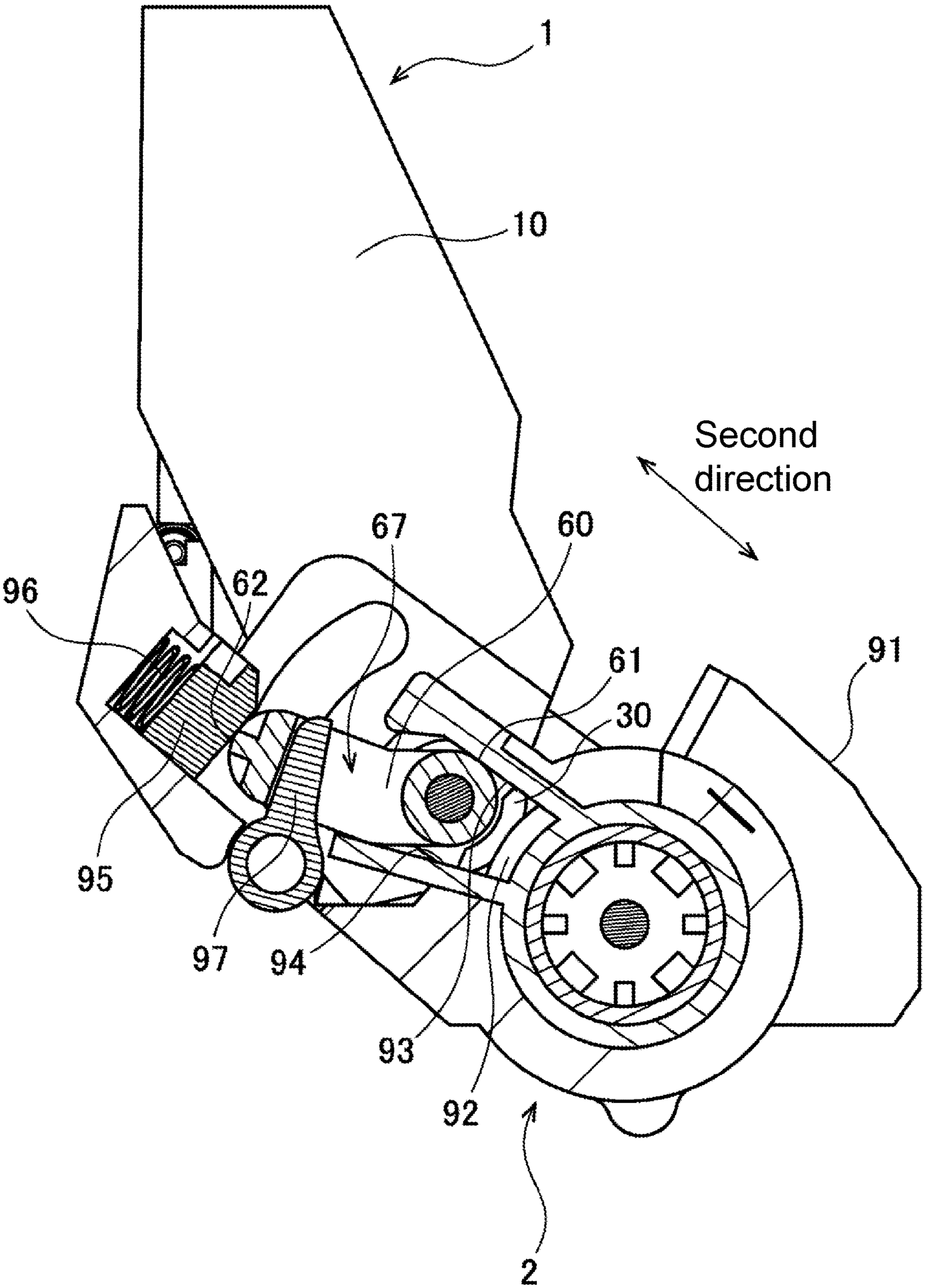
FIG. 11 is a cross-sectional view of the developing cartridge and the drum cartridge when the developing cartridge is mounted on the drum cartridge.

As illustrated in FIGS. 8 to 11, when the developing cartridge 1 is mounted on the drum cartridge 2, the developing cartridge 1 is moved relative to the drum cartridge 2 so that the developing roller 30 moves close to the photosensitive drum 92. At this time, as illustrated in FIGS. 9 to 11, the first end portion 61 of the first bearing 60 is brought into contact with the second guide surface 94 and moves along the second guide surface 94. Accordingly, the first bearing 60 pivots about the rotation axis A1 from the first position to the second position. Similarly, the third end portion 71 of the second bearing 70 is brought into contact with the fourth guide surface and moves along the fourth guide surface. Accordingly, the second bearing 70 pivots about the rotation axis A1 from the third position to the fourth position.

As described above, when the developing cartridge 1 is mounted on the drum cartridge 2, the first bearing 60 and the second bearing 70 pivot about the rotation axis A1 of the developing roller 30. As a result, without rotating the casing 10 with respect to the drum frame 91, the first bearing 60 can be placed between the photosensitive drum 92 and the first movable member 95. In addition, the second bearing 70 can be placed between the photosensitive drum 92 and the second movable member. Consequently, a user of the cartridges and the image forming apparatus can move the developing roller 30 close to the photosensitive drum 92 without performing the operation to rotate the casing 10.

With the first bearing 60 placed between the photosensitive drum 92 and the first movable member 95, the first movable member 95 is in contact with the second end portion 62 of the first bearing 60. At this time, the first movable member 95 applies pressure to the second end portion 62 of the first bearing 60 toward the photosensitive drum 92 by the resilience force of the first coil spring 96. Then, as illustrated in FIG. 11, the first end portion 61 of the first bearing 60 is brought into contact with the first guide surface 93, and the second end portion 62 of the first bearing 60 is brought into contact with the second guide surface 94. In this manner, the position of the first bearing 60 relative to the drum frame 91 is fixed.

Similarly, the second movable member applies pressure to the fourth end portion 72 of the second bearing 70 toward the photosensitive drum 92. At this time, the third end portion 71 of the second bearing 70 is brought into contact with the third guide surface, and the fourth end portion 72 of the second bearing 70 is brought into contact with the fourth guide surface. In this manner, the position of the second bearing 70 relative to the drum frame 91 is fixed.

Furthermore, the first movable member 95 applies pressure to the first bearing 60 with the positions of the first bearing 60 and the second bearing 70 relative to the drum frame 91 fixed. In addition, the second movable member applies pressure to the second bearing 70. Thus, the outer peripheral surface of the developing roller 30 is brought into contact with the outer peripheral surface of the photosensitive drum 92. In this manner, the developing roller 30 is urged against the photosensitive drum 92.

As described above, according to the present embodiment, the first bearing 60 has the first end portion 61 and the second end portion 62, and the second end portion 62 is pivotable with respect to the first end portion 61. In addition, the second bearing 70 has the third end portion 71 and the fourth end portion 72, and the fourth end portion 72 is pivotable with respect to the third end portion 71. Consequently, the positioning of the developing roller 30 relative to the photosensitive drum 92 can be achieved by using the first end portion 61 and the second end portion 62 of the first bearing 60 and the third end portion 71 and the fourth end portion 72 of the second bearing 70.

Furthermore, according to the present embodiment, when the developing cartridge 1 is being mounted on the drum cartridge 2, the first bearing 60 and the second bearing 70 pivot about the rotation axis A1. In addition, when the developing cartridge 1 is being removed from the drum cartridge 2, the first bearing 60 and the second bearing 70 pivot about the rotation axis A1 in the same manner. For this reason, the developing cartridge 1 can be smoothly mounted on or removed from the drum cartridge 2 by causing the first bearing 60 and the second bearing 70 to pivot without rotating the casing 10.

5. Information About Supply of Voltage

Figure 12:
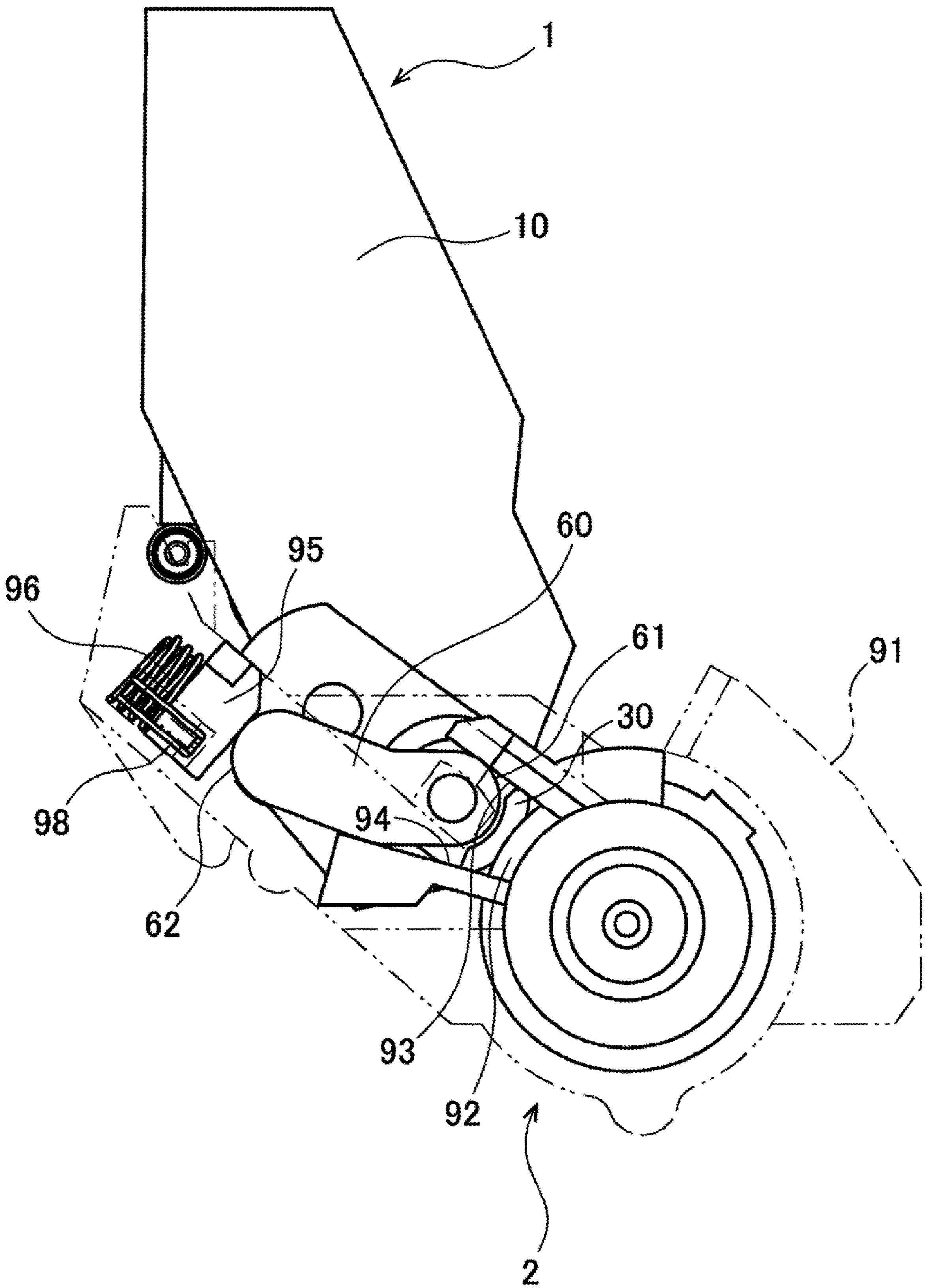
FIG. 12 is a side view of the developing cartridge and the drum cartridge after the developing cartridge is mounted on the drum cartridge.

FIG. 12 is a side view of the developing cartridge 1 and the drum cartridge 2 with the developing cartridge 1 mounted on the drum cartridge 2. Note that in FIG. 12, the drum frame 91 is denoted by a two-dot chain line.

The first movable member 95 and the first coil spring 96 are electrically conductive. The first movable member 95 is made of, for example, a conductive resin. The first coil spring 96 is made of, for example, metal. In addition, as illustrated in FIG. 12, the drum cartridge 2 includes an electrode terminal 98 that is in electrical contact with the first coil spring 96. As illustrated in FIGS. 1 and 2, the electrode terminal 98 is exposed on the outer surface of the drum frame 91. Furthermore, as described above, the developing roller shaft 32 and the first bearing 60 are electrically conductive. For this reason, when the developing cartridge 1 is mounted on the drum cartridge 2 and, thus, the first movable member 95 is brought into contact with the first bearing 60, the electrode terminal 98, the first coil spring 96, the first movable member 95, the first bearing 60, and the developing roller shaft 32 are electrically connected to one another.

When the developing cartridge 1 mounted on the drum cartridge 2 is mounted in the image forming apparatus, the electrode terminal of the image forming apparatus is in contact with the electrode terminal 98 of the drum cartridge 2. Thus, a bias voltage is supplied from the image forming apparatus to the developing roller shaft 32 via the electrode terminal 98, the first coil spring 96, the first movable member 95, and the first bearing 60. As a result, the developer material is attracted to the outer peripheral surface of the developing roller main body 31 by the electrostatic force generated by the bias voltage.

As described above, according to the present embodiment, the bias voltage is supplied to the first bearing 60 of the developing cartridge 1 via the first movable member 95 of the drum cartridge 2. In this way, the number of parts of the drum cartridge 2 can be reduced as compared with the case where a conductive part for supplying a voltage to the first bearing 60 is provided separately from the first movable member 95. Therefore, the size of the drum cartridge 2 can be reduced.

In addition, the first bearing 60 according to the present embodiment has (1) the capability of serving as a bearing for rotatably supporting the developing roller shaft 32 and (2) the capability of serving as a positioning member that determines the position of the developing roller 30 relative to the photosensitive drum 92 when the developing cartridge 1 is mounted on the drum cartridge 2 and (3) the capability of serving as a developing electrode for supplying a bias voltage to the developing roller shaft 32. For this reason, the number of parts in the developing cartridge 1 can be reduced as compared with the case where these capabilities are provided by using different members. In addition, the size of the developing cartridge 1 can be reduced.

6. Information About Separating Operation

After the developing cartridge 1 mounted on the drum cartridge 2 is mounted in the image forming apparatus, the developing cartridge 1 can perform a separating operation by the driving force supplied from the image forming apparatus. As used herein, the term "separating operation" refers to an operation to temporarily separate the developing roller 30 from the photosensitive drum 92. For example, when monochrome printing is performed in the image forming apparatus, the developing cartridges 1 of colors other than black perform the separating operation. Note that the developing cartridge 1 of black color may perform the separating operation.

As illustrated in FIG. 11, when the developing cartridge 1 is mounted on the drum cartridge 2, the developing cartridge 1 is disposed at a contact position at which the developing roller 30 is in contact with the photosensitive drum 92. At this time, the first lever 97 of the drum cartridge 2 is inserted into the first hole 67 of the first bearing 60. In addition, a second lever (not illustrated) of the drum cartridge 2 is inserted into the third hole 77 of the second bearing 70.

Figure 13:
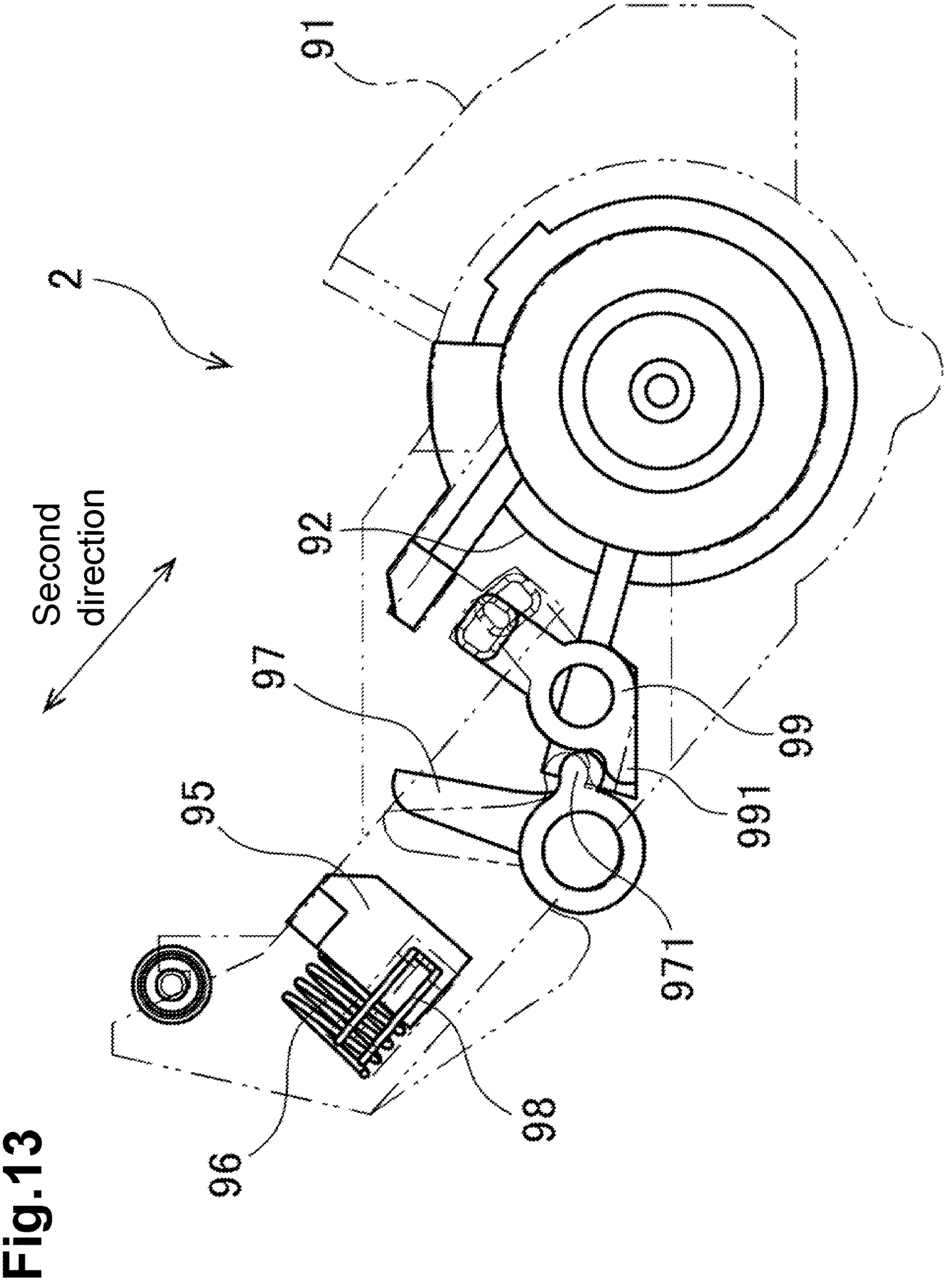
FIG. 13 is a side view of the drum cartridge.

FIG. 13 is a side view of the drum cartridge 2. In FIG. 13, the drum frame 91 is denoted by a two-dot chain line. As illustrated in FIG. 13, the drum cartridge 2 includes a first cam 99. The first cam 99 is located between the photosensitive drum 92 and the first lever 97 in the second direction. In addition, the first cam 99 is located between each of the above-described first guide surface 93 and second guide surface 94 and the drum frame 91 in the first direction. When the separation operation is performed, the first cam 99 pivots about a rotation shaft extending in the first direction by the driving force supplied from the image forming apparatus. Thus, a projection 991 of the first cam 99 presses a projection 971 of the first lever 97. As a result, the first lever 97 pivots about the rotation axis extending in the first direction, from a position indicated by the solid line to a position indicated by a two-dot chain line illustrated in FIG. 13. In addition, the drum cartridge 2 includes a second cam similar to the first cam 99 in order to cause the second lever to pivot.

Figure 14:
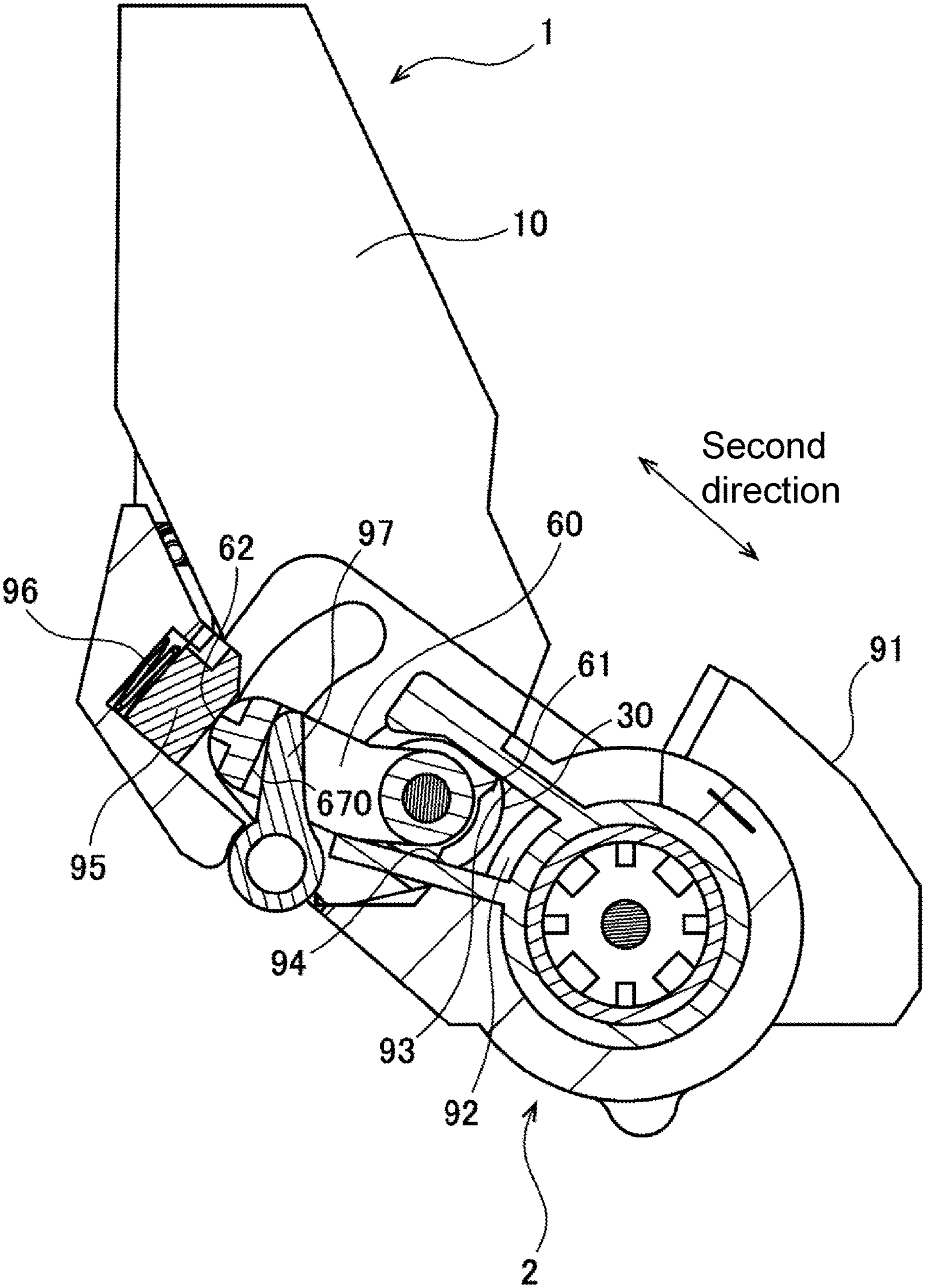
FIG. 14 is a cross-sectional view of the developing cartridge and the drum cartridge during a separating operation.

FIG. 14 is a cross-sectional view of the developing cartridge 1 and the drum cartridge 2 at the time of the separating operation. FIG. 14 is a cross-sectional view of the developing cartridge 1 and the drum cartridge 2 taken along a broken line S-S in FIG. 6. When the first lever 97 is rotated by the first cam 99, the first lever 97 presses an inner surface 670 of the first hole 67 of the first bearing 60. More specifically, the first lever 97 presses the second end portion 62 of the first bearing 60 in a direction away from the photosensitive drum 92 against the pressing force of the first coil spring 96. In addition, when the second lever is caused to pivot by the second cam, the second lever presses the inner surface of the third hole 77 of the second bearing 70. More specifically, the second lever presses the fourth end portion 72 of the second bearing 70 in a direction away from the photosensitive drum 92 against the pressing force of the second coil spring.

Thus, the casing 10 and the developing roller 30 move in the direction away from the photosensitive drum 92 together with the first bearing 60 and the second bearing 70. As a result, the outer peripheral surface of the developing roller 30 is separated from the outer peripheral surface of the photosensitive drum 92. That is, the developing cartridge 1 moves from the above-described contact position to the separated position with respect to the drum cartridge 2.

As described above, according to the present embodiment, the developing cartridge 1 can be moved from the contact position to the separated position by pressing the first bearing 60 and the second bearing 70. For this reason, the number of parts of the developing cartridge 1 can be reduced as compared with the case where a member that receives a pressing force at the time of the separation operation is provided separately from the first bearing 60 and the second bearing 70. Consequently, the size of the developing cartridge 1 can be reduced more.

In addition, the first bearing 60 is pivotable about the rotation axis A1. Therefore, the first lever 97 can press the inner surface 670 of the first hole 67 of the first bearing 60 in an optimum direction without rotating the casing 10. Similarly, the second bearing 70 is pivotable about the rotation axis A1. Therefore, the second lever can press the inner surface of the third hole 77 of the second bearing 70 in an optimum direction without rotating the casing 10.

In addition, when the developing cartridge 1 moves from the contact position to the separated position, the first bearing 60 moves along the second guide surface 94. Furthermore, the second bearing 70 moves along the fourth guide surface. In this manner, the first lever 97 can press the first bearing 60 while maintaining the position of the first bearing 60 relative to the rotation axis A1 serving as the central point. Furthermore, the second lever can press the second bearing 70 while maintaining the position of the second bearing 70 relative to the rotation axis A1 serving as the central point.

7. Modifications

While an embodiment of the present disclosure has been described above, the present disclosure is not limited to the above-described embodiment. A variety of modifications are described below, focusing on differences between the modifications and the above-described embodiment.

7-1. First Modification

Figure 15:
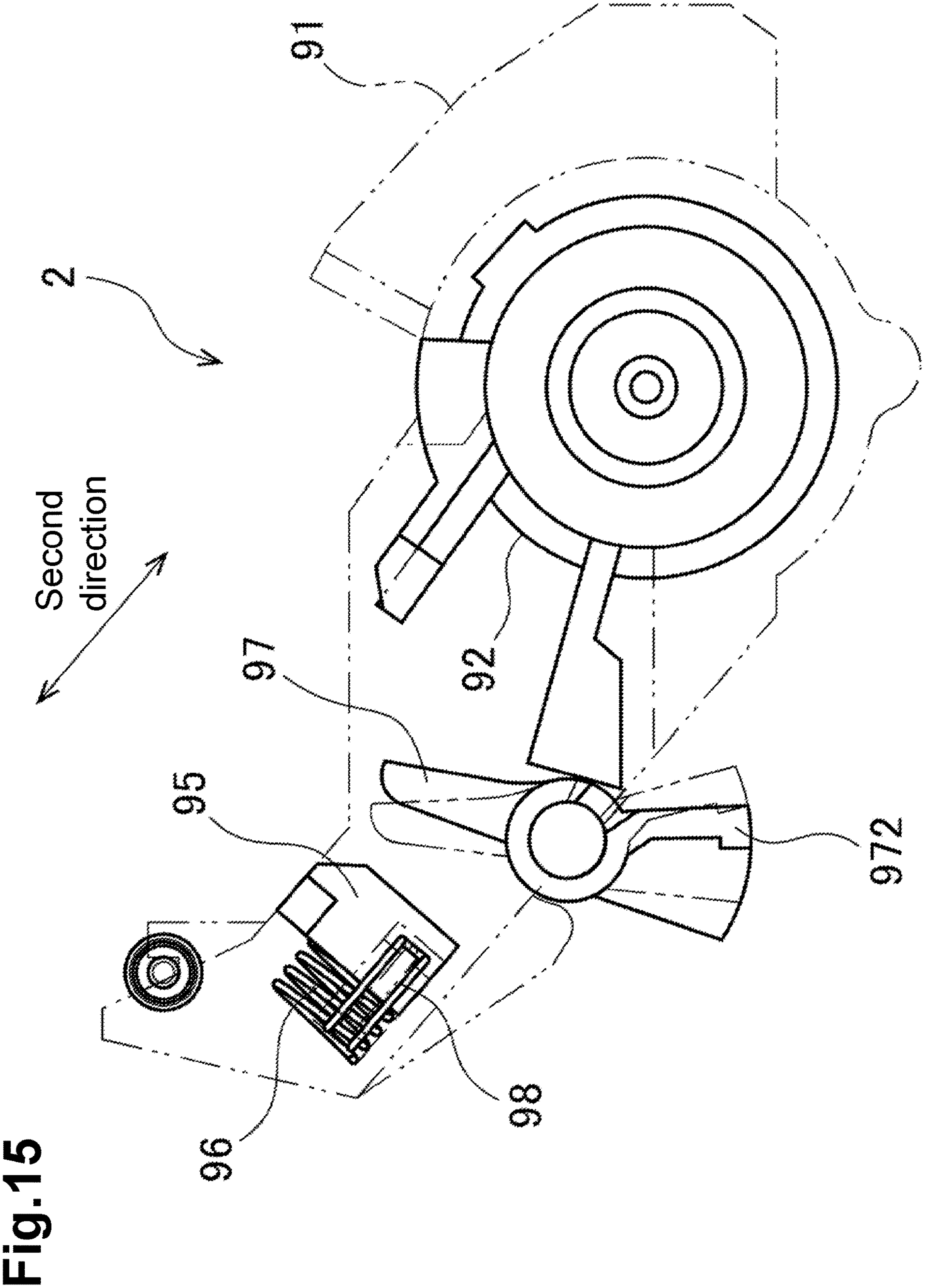
FIG. 15 is a side view of a drum cartridge according to a first modification.

The first modification is a modification relating to a mechanism for operating the first lever 97 of the drum cartridge 2. FIG. 15 is a side view of the drum cartridge 2 of the first modification. In FIG. 15, the drum frame 91 is denoted by a two-dot chain line. In the example of FIG. 15, the drum cartridge 2 does not include the first cam 99. The first lever 97 has a projection 972 for receiving a drive from the image forming apparatus. When the separating operation is performed, the image forming apparatus presses the projection 972 of the first lever 97. As a result, the first lever 97 pivots about a rotation shaft extending in the first direction. As described above, if the need for the first cam 99 is eliminated, the number of parts of the developing cartridge 1 can be reduced more.

7-2. Second Modification

Figure 16:
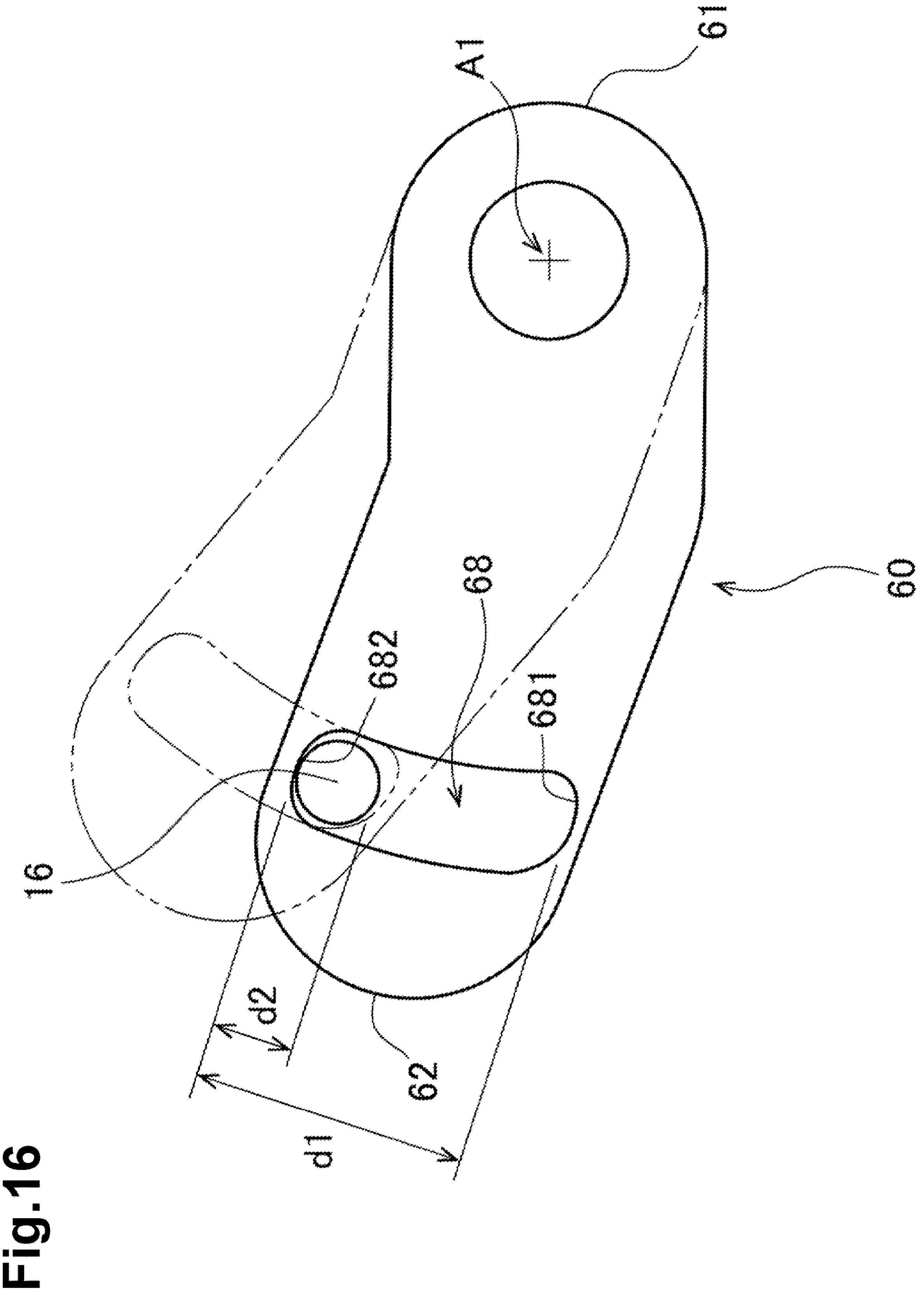
FIG. 16 is a side view of a first bearing according to a second modification.

The second modification is another modification relating to a structure for restricting the rotation range of the first bearing 60. FIG. 16 is a side view of a first bearing 60 according to the second modification. In the example of FIG. 16, the first bearing 60 has a second hole 68 in the second end portion 62. The second hole 68 extends in the first direction from the surface of the second end portion 62 of the first bearing 60 on the other side in the first direction toward the surface on the one side in the first direction.

In addition, in the example of FIG. 16, a casing 10 has a casing shaft 16. The casing shaft 16 extends in the first direction from the first outer surface 11 of the casing 10 toward one side in the first direction. The casing shaft 16 is inserted into the second hole 68 of the first bearing 60.

As illustrated in FIG. 16, a length d1 of the second hole 68 is longer than a length d2 of the casing shaft 16 in the pivotal direction of the second end portion 62 about the rotation axis A1. In addition, the second hole 68 has a first inner side surface 681 and a second inner side surface 682. The first inner side surface 681 and the second inner side surface 682 are separated from each other in the above-described pivotal direction.

Like the above-described embodiment, the first bearing 60 is pivotable about the rotation axis A1 between a first position (the position denoted by a two-dot chain line illustrated in FIG. 16) and a second position (the position denoted by a solid line in FIG. 15). When the first bearing 60 is located at the first position, the casing shaft 16 is in contact with the first inner side surface 681. In contrast, when the first bearing 60 is located at the second position, the casing shaft 16 is in contact with the second inner side surface 682. Thus, the rotation range of the first bearing 60 is restricted.

7-3. Other Modifications

According to the above-described embodiment, the developing cartridge 1 includes the first bearing and the second bearing. The first bearing and the second bearing have the same shape, and both are pivotable with respect to the casing 10. However, the second bearing may have a shape that differs from that of the first bearing. In addition, the second bearing may be non-pivotable with respect to the casing 10. Furthermore, the developing cartridge 1 does not necessarily have to include the second bearing. In this case, the first bearing can be placed at either one of the ends of the casing 10 in the first direction.

According to the above-described embodiment, the developing cartridge 1 is mounted on the drum cartridge 2 including only one photosensitive drum 92. However, the developing cartridge 1 may be mounted on a drum cartridge including a plurality of photosensitive drums 92.

Furthermore, the shape of the detail of the developing cartridge 1 may differ from the shape illustrated in any one of the drawings of the present application. In addition, the elements appearing in the above-described embodiment and modifications may be combined in any way as long as no conflicts occurs.

What is claimed is:

1. A cartridge comprising:
- a drum frame including a photosensitive drum;
- a casing capable of containing a developer material, the casing including:
  - a developing roller including a developing roller shaft extending in an axial direction; and
  - a developing electrode electrically connected to the developing roller shaft, the developing electrode having a hole passing completely through the developing electrode, and
- a pressing surface being inserted into the hole, the pressing surface presses the developing roller toward the photosensitive drum by pressing an inner surface of the hole.

2. The cartridge according to claim 1,
- wherein the pressing surface is movable relative to the drum frame.

3. The cartridge according to claim 1, further comprising:
- a developing cartridge including the casing, and
- a drum cartridge including the drum frame and the pressing surface.

4. The cartridge according to claim 3,
- wherein the developing cartridge is movable relative to the drum cartridge between a contact position at which the developing roller is at the first position and a separated position at which the developing roller is at the second position, and
- wherein the developing cartridge moves from the separated position to the contact position when the pressing surface presses the inner surface of the hole.

5. The cartridge according to claim 1,
- wherein the developing electrode is made of a conductive resin.

6. The cartridge according to claim 1,
- wherein the casing further includes:
- a first outer surface;

a second outer surface opposite to the first outer surface in the axial direction; and a developing roller gear fixed to the developing roller shaft, the developing roller gear being located adjacent to the second outer surface, and wherein the developing electrode is located adjacent to the first outer surface.

7. The cartridge according to claim 1, further comprises a lever pivotable about a shaft extending in the axial direction, the lever includes the pressing surface.

8. The cartridge according to claim 1, wherein the developing electrode serves as a bearing that rotatably supports the developing roller shaft.

* * * * *